Figure 1:
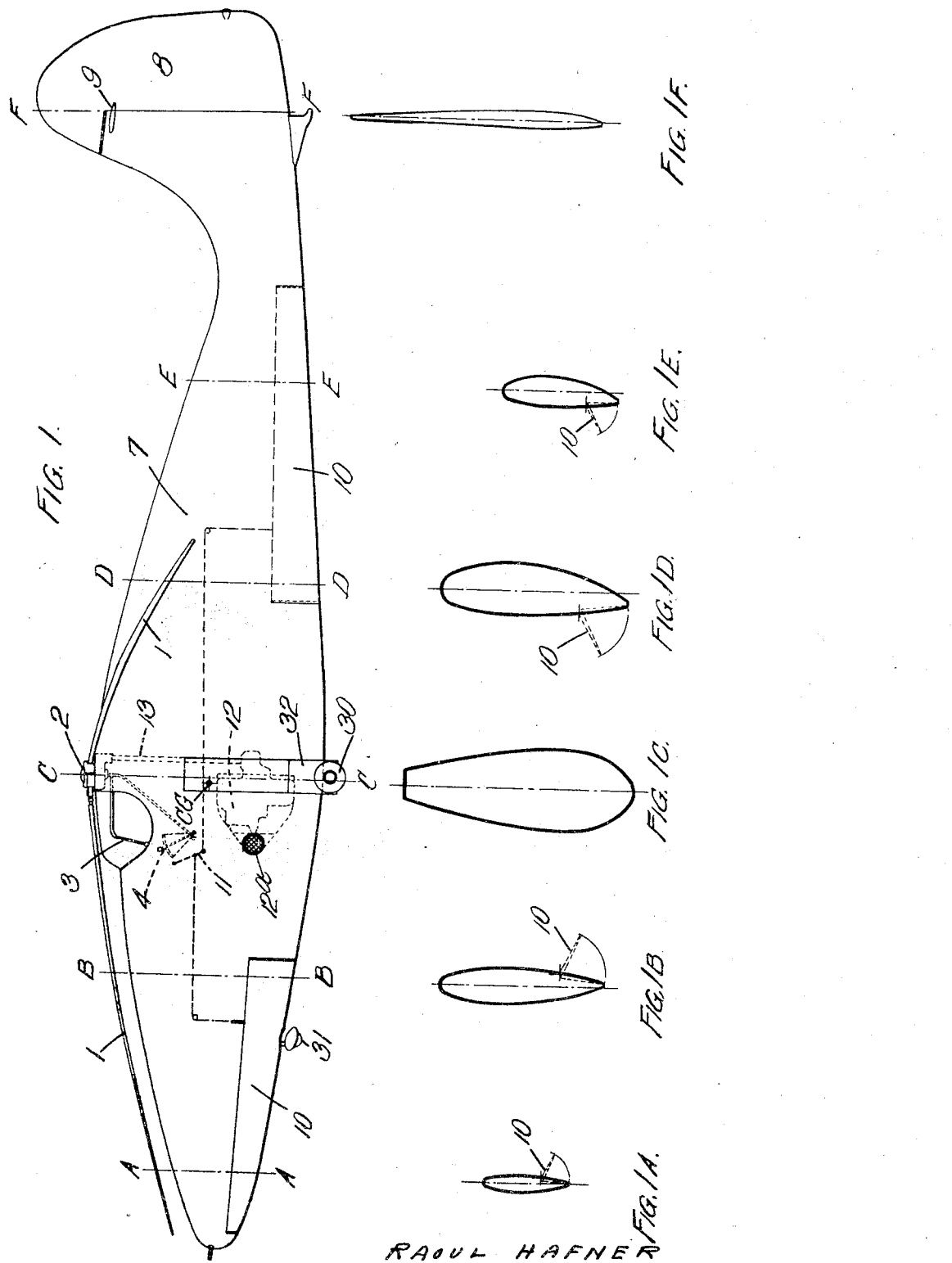

Jan. 11, 1944.   R. HAFNER   2,338,935
HELICOPTER
Filed Aug. 6, 1938   4 Sheets-Sheet 2

RAOUL HAFNER
INVENTOR
By Otto Munk
HIS ATT'Y.

Jan. 11, 1944.　　　　R. HAFNER　　　　2,338,935
HELICOPTER
Filed Aug. 6, 1938　　　　4 Sheets-Sheet 3

RAOUL HAFNER
INVENTOR
By Otto Munk
HIS ATT'Y.

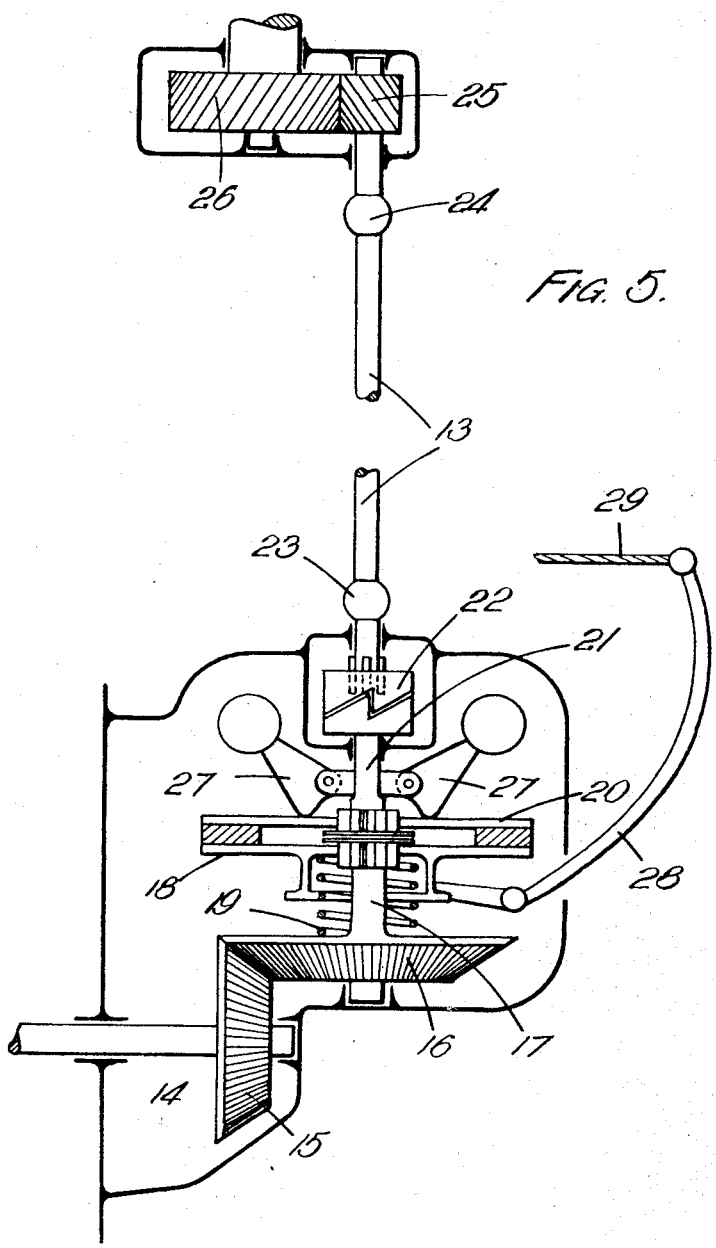

Patented Jan. 11, 1944

2,338,935

UNITED STATES PATENT OFFICE 2,338,935

HELICOPTER

Raoul Hafner, Vienna, Germany; vested in the Alien Property Custodian

Application August 6, 1938, Serial No. 223,406
In Great Britain August 16, 1937

6 Claims. (Cl. 244—17)

This invention relates to helicopters, that is to say to aircraft having supporting rotors mechanically driven in normal flight and each comprising a plurality of blades radiating from a hub structure.

It is commonly assumed that the most desirable form of helicopter is that which will support the greatest weight for a given power input when hovering stationary.

This object will, however, involve a sacrifice of efficiency in forward flight, and the present invention is based on the contrasting view that one of the most important features of the helicopter as a type is the possibility of obtaining a high power efficiency in ordinary forward flight, and that it is essential to secure this even at the expense of an appreciable loss of hovering efficiency. Such a loss should not be a serious handicap in practise, since in any case it is nowadays possible to provide an ample power reserve.

It is therefore the basic object of this invention to obtain the maximum power efficiency of helicopters in forward flight, and for this purpose I contemplate providing helicopters with rotor systems so constructed as to absorb the flight power input at a relatively high tip speed and consequently at a relatively low torque. I find that although this means an appreciable increase in power for hovering flight, the torque is nevertheless substantially reduced as compared with slower rotors even during such hovering.

Consideration will show that, for a given forward speed of the aircraft, a high-speed blade will be subject to a smaller cyclic fluctuation of its effective angle of attack during rotation than a low-speed blade; as a result the angle of attack, at least at moderate speeds, may remain relatively close to the angle giving the best ratio of lift to drag for the blade section used, with a consequent gain in efficiency. Moreover, the maximum forward speed of the aircraft is also increased by a high-speed rotor system, since the blades on the retreating side do not stall until a correspondingly high translational speed is reached.

These results are obtained quite generally in all types of helicopters, but a high-speed low-torque rotor is of especial advantage in the single rotor type of helicopter, as will be explained later.

I have obtained an expression for the torque $dQ$ absorbed by an annular element (of radius $r$) in a rotor disk when giving an axial thrust or lift $dT$. This is found to be:

$$dQ = dT \cdot r \cdot \left[\frac{C_{Dp}}{C_L} + \frac{1}{2}\sqrt{C_L \cdot \sigma}\right]$$

where $C_{Dp}$ and $C_L$ are respectively the profile drag and lift coefficients (in Continental units) of the blade section used, and $\sigma$ is the solidity (i. e. the ratio of blade area to disk area) over the annular area in question.

From this, it will be seen that the nondimensional expression $$\left[\frac{C_{Dp}}{C_L} + \frac{1}{2}\sqrt{C_L \cdot \sigma}\right]$$

is a measure of the torque absorbed by a given rotor element at a given lift, and it will therefore be referred to for simplicity as the "torque factor." Since $C_{Dp}$ and $C_L$ vary somewhat for a given blade section according to the angle of attack for which they are quoted, it will be convenient to refer to the minimum value of this torque factor.

The different annular areas will have different solidities in the general case, and consequently the minimum torque factor will vary along a blade; normally of course it will diminish towards the tip. Also, in view of these changes in solidity, the torque factors will be at a minimum for different values of $C_{Dp}$ and $C_L$.

However, by examination of a rotor in conjunction with the lift/drag curve of the blade section used, the mean value of the minimum torque factors over the whole lifting portion may readily be determined, and this is a criterion of a helicopter rotor according to the invention.

Thus, although the proposal to construct helicopters on what may be termed the "high-speed rotor" principle is in any case new, as far as I am aware, the present invention may be stated for the purpose of definition as a helicopter in which the rotor system is constructed to absorb the flight power input at a high tip speed and a correspondingly low torque by providing a blade section and a rotor solidity such that the mean of the minimum torque factors over the whole working or lifting portion of a rotor disk has a value below 0.09.

Another convenient way of expressing the invention takes account of the ratio of the torque on a rotor to its thrust when hovering stationary. This may be ascertained by direct measurement, and its units will evidently be units of length. When expressed as a proportion of the rotor radius, it is a criterion of the rotor from the present point of view.

Again, this figure will vary somewhat according to conditions (more especially pitch setting) but the invention may be stated as a helicopter in which the rotor system is constructed to absorb the flight power input at a high tip speed and a corrrespondingly low torque such that the ratio of torque to thrust of a rotor in stationary hovering has a minimum value below 0.09 of the rotor radius.

It also appears that if a helicopter rotor is constructed to operate at a sufficiently high speed, the influence of flow through the rotor on the effective angle of attack of the blades may be so reduced that the optimum pitch setting for power operation (at least in ordinary forward flight) lies within the auto-rotational range of pitch settings, and a useful alternative definition of the invention is therefore a helicopter with a rotor system having this feature. In such a helicopter, a failure of the drive (assuming of course that the customary freewheel is fitted) would not demand an instant adjustment of pitch to keep the rotor system in action, and the value of such an inherent feature will be apparent.

The invention is particularly important in its application to the single-rotor helicopter. This type is generally recognised as having greater possibilities than the double or multi-rotor types, because it avoids the mass and complexity of duplicated driving and control connections, and also in certain arrangements the weight and drag of outrigger structures for carrying rotors. The single rotor has a good lift distribution across the span in forward flight, and the complete aerodynamic control of the aircraft may be very simply arranged by providing means for tilting the plane of rotation of the rotor in any direction and for varying its pitch as a whole.

So far, however, the problem of neutralising the torque reaction on the fuselage during hovering (at any rate whilst still obtaining a useful forward flight) has prevented the practical development of a satisfactory single-rotor helicopter.

By providing such a machine with a single rotor according to the invention, however, the torque reaction is made so low that it can be counteracted even during hovering by means which do not substantially affect the general efficiency in forward flight. For example, by shaping the fuselage to conform with small effective "angles of attack" to the rotor downwash, a sufficient countertorque may be aerodynamically imposed on it during hovering without the aid of "external" devices impeding forward flight.

Figure 2:
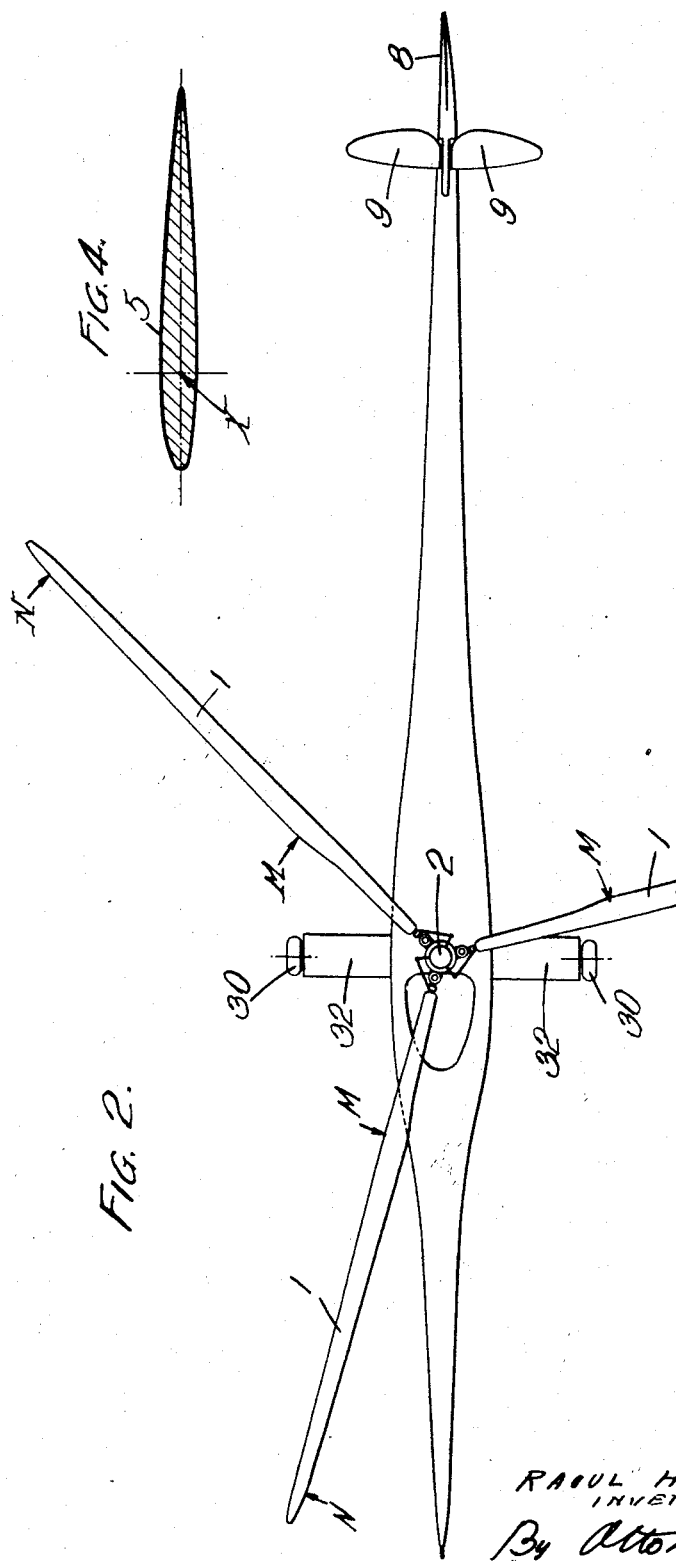
Figure 3:
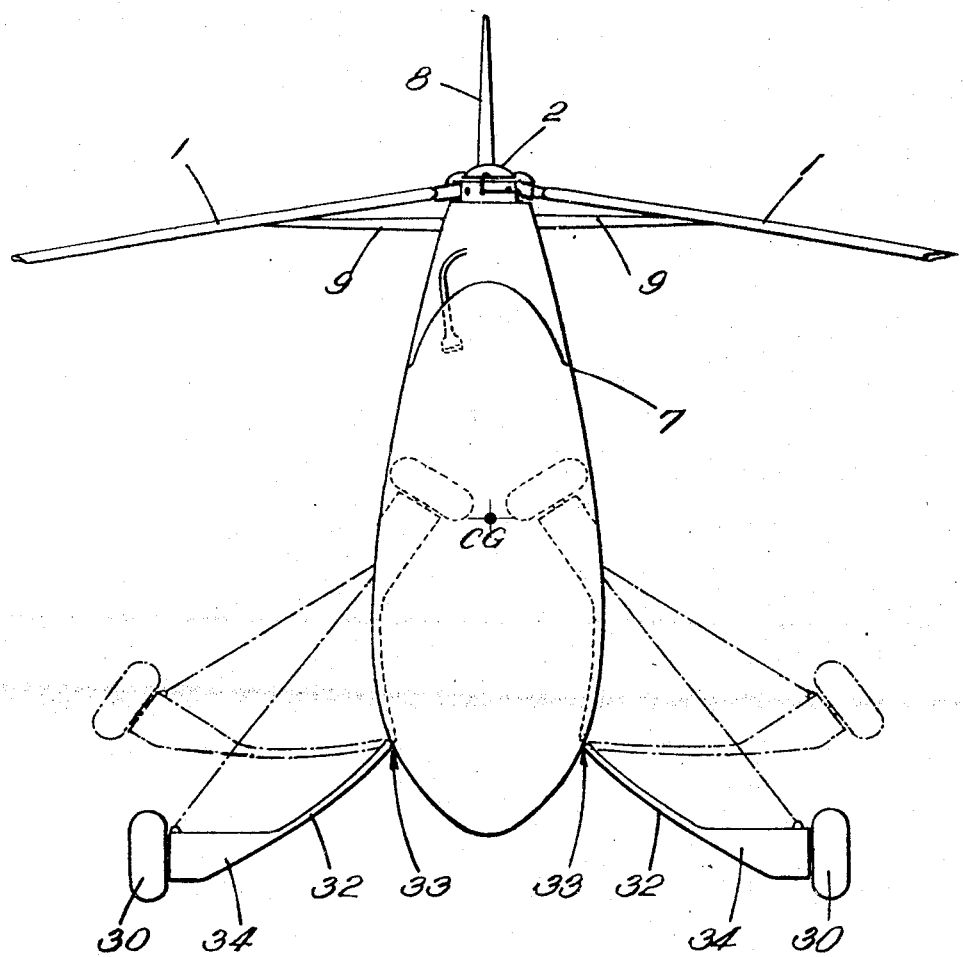

A single-rotor helicopter according to the invention and constructed on this principle is illustrated by way of example in the accompanying drawings, of which:

Figure 1 is a side elevation,
Figures 1A to 1F are cross-sections viewed from the front of the fuselage in the planes A—A to F—F respectively of Figure 1,
Figure 2 is a plan view,
Figure 3 is a front elevation,
Figure 4 shows the blade section on an enlarged scale, and
Figure 5 is an enlarged and somewhat diagrammatic sectional view of the power transmission means between the engine and the rotor.

Dealing first with the general construction of the rotor of the machine shown; the three blades 1 are attached to the hub 2 by articulations allowing them to flap up and down and to execute independent "drag" movements to some extent in the plane of rotation. The rotor in general is constructed and controlled as described in United States patent application Serial No. 115,530 filed December 12, 1936, the blade pitch angles being "differentially" controlled to tilt the plane of rotation by a universally-tiltable control column 3 (Figure 1), and the general or mean rotor pitch being adjustable as a whole by the "lift" lever 4.

The working or lifting portion of each blade is about the outer two thirds thereof, the inner third being a simple streamlined supporting spar which encloses a radial tie rod anchoring the blade to the hub. The torsional resilience of the tie-rod is arranged to stabilise the blade at its optimum mean pitch for forward flight, and it also takes the centrifugal load of the blade, allowing its pitch to be altered without friction or wear. This feature is fully set forth in the said application Serial No. 115,530, and it is therefore unnecessary to illustrate it in detail here.

The airfoil section chosen for the lifting portions of the blades is the high-speed section shown in Figure 4 and known as N. A. C. A. 23009. The maximum thickness is 9% of the chord, and the blade is built with a stressed skin 5 of stainless or plated steel sheet. The blade is suitably weighted and stiffened at the nose and, in general, constructed in accordance with the principles set out in United States patent application Serial No. 169,382 filed October 16, 1937. That is to say, each sectional element of the lifting portion has a substantially constant center of pressure situated at the mass center of the element, and the blade is so shaped that all these centers lie on a common straight line or axis of balance X, the neutral torsional axis or "stiffness" axis of the blade being arranged at or in front of the axis X. In the present case these axes are arranged to coincide with each other and also with the tie-rod axis about which the blade is turned to adjust its pitch. As explained in the said application Serial No. 169,382, this arrangement gives a dynamically balanced blade free from fluttering tendencies in flight, and this is evidently important in view of the long, thin and narrow nature of the blades in the present case.

The blades are tapered in plan so as to give the optimum lift distribution over the lifting area of the rotor disk, and are given a suitable twist along their length to keep the effective angle of attack correct at each point during flight. The overall rotor solidity is under 4%; at the points M it is of course greater, and over the annular element of area containing these points the solidity is 6.30%. From the published data relating to the section N. A. C. A. 23009 it is found that the minimum value of the torque factor $$\left[\frac{C_{D_p}}{C_L}+\frac{1}{2}\sqrt{C_L\cdot\sigma}\right]$$

is 0.087 when $\sigma=0.063$, and is obtained by using the values $C_{D_p}=0.0067$ and $C_L=0.19$.

Similarly, at points N the solidity has the much lower figure of 1.10%, and the torque factor is found to be at a minimum of 0.05 when the values $C_{D_p}=0.0071$ and $C_L=0.36$ are used.

In the first case the values of $C_{D_p}$ and $C_L$ used are those quoted for an angle of attack of 1° and in the second case they relate to an angle of 2.5°; it will be appreciated however that these angles are mentioned only because they happen to give the minima in calculating the torque factors, and that they have no significance as regards the actual setting of the blades.

Thus we have minimum torque factors of 0.087 at M and 0.05 at N, and it is obvious that if (for example) further values are taken at equidistant points along the rotor radius the mean value over the whole lifting portion will be found to be well below the limit of 0.09.

Investigation shows that, as previously mentioned, the optimum pitch setting of this high-speed rotor for ordinary forward flight is also one at which the rotor will auto-rotate in the event of engine failure. This is evidently a most valuable feature, even if it is advisable subsequently to reduce the pitch to obtain the actual optimum auto-rotative condition.

As shown in Figures 1 to 3, the fuselage 7 is generally fish-shaped, being relatively deep and narrow. At its central part it has a roughly oval symmetrical cross-section (see Figure 1C), but its shape is progressively modified towards the nose and tail into unsymmetrical airfoil sections (see Figures 1A, 1B, 1D and 1E), which are upwardly directed but oppositely cambered.

Thus the fuselage has, in effect, the form of an airscrew of very high pitch freely carried on the rotor axis, and tending to revolve in the down-wash of the rotor. From the drawings it will be seen that the rotor revolves clockwise in plan, and that the fuselage tends also to revolve in this sense, i. e. in opposition to the mechanical torque reaction on it. Investigation shows that in the aircraft illustrated a complete neutralisation of the torque reaction in this way can be expected even while hovering, whilst it is evident that the fuselage is at the same time wholly suited for fast forward flight.

The curve of the fuselage top (Figure 1) is arranged to follow closely the droop of the blades when at rest, in order that the fuselage may have the maximum area as an airfoil and also so that its ends (which are most effective in providing the aerodynamic counter-torque) shall not be unduly far below the rotor disk in flight.

These objects may if desired be more fully met by giving the blades during manufacture a slight inherent upward curvature or "set" to reduce their droop when at rest. During flight, centrifugal force would of course entirely overcome any such "set."

Since the fuselage is approximately symmetrical in side elevation about the rotor axis and center of gravity C. G. (Figure 1), it is provided at the rear with an adjustable tail fin or rudder 8 of large area for directional stability and control, and also has a tailplane 9 (which may be adjustable) to assist in maintaining trim. These surfaces are mounted well clear of the rotor downwash in all conditions of flight.

It will be appreciated that, for a given throttle opening, the degree of torque counter-action required from the fuselage proper may vary somewhat according (for example) to whether the machine is flying level or climbing. It may prove possible so to shape the fuselage that these variations will automatically be met in view of the differences in distribution of the downwash over the fuselage, and in any case they can be offset by tilting the rotor slightly to one side and turning the rudder to the same side, thus producing an auxiliary corrective couple on the machine. Also, if desired, flaps or "ailerons" 10 may be fitted for modifying the effective camber of the fuselage and connected to an operating lever 11 in the pilot's cockpit, or to the rudder bar (not shown).

In ordinary forward flight, however, the action of the fuselage alone will be quite sufficient, and in this connection it may be mentioned that with a suitable rotor the helical component of the downwash may in itself give all the necessary angle of attack on the fuselage. In such a case the fuselage could be absolutely symmetrical about the longitudinal vertical plane, the auxiliary couples being applied when necessary by either of the above methods.

As regards the rotor driving mechanism; this comprises an engine and clutch unit 12 (Figure 1) below the rotor, which it drives through a jointed and telescopic vertical shaft 13 coupled at its upper end to the rotor hub. The engine also drives a fan or blower (not shown) for drawing cooling air through an aperture 12a in the fuselage and expelling it through a similar aperture on the other side.

As shown somewhat diagrammatically in Figure 6, the engine crankshaft 14 is geared by bevel pinions 15 and 16 to a vertical clutch driving shaft 17 on which the driving clutch plate 18 is splined. A spring 19 normally holds this plate up to the limit of its travel. The driven plate 20 rests on the plate 18, and is similarly splined to the driven shaft 21. This shaft 21 is connected through a freewheel device 22 and a universal joint 23 to the lower end of the telescopic driving shaft 13, and the upper end of the latter is similarly jointed at 24 to the shaft of the small pinion 25 meshing with the rotor hub pinion 26.

The arrangement is such that the drive will fracture at or near the part 25, 26 as a safety measure if for some reason it becomes jammed lower down. This may be ensured, for example, by pinning the final pinion 26 to its shaft by means of a key (not shown) adapted to shear on the application of a shock torque exceeding a predetermined maximum figure.

In view of the nature of the blades it is important that when accelerating the rotor from rest, and in fact until it has attained sufficient speed for centrifugal force to take effect, the maximum torque imposed on it shall be strictly limited in order to avoid bending and damaging the blades or their root fittings.

For this reason the operating mechanism of the clutch 18, 20 is arranged in accordance with United States patent application, Serial No. 33,462, filed July 27, 1935, namely so that the maximum torque transmissible by the clutch (i. e. its effective degree of engagement) is automatically reduced at low speeds of the driven plate 20 and therefore of the rotor. For this purpose the driven clutch shaft 21 carries pivoted centrifugally-actuated cams 27 adapted to exert an increasing engagement pressure on the plates as the rotor speeds up. Initially the cams 27 are in the position shown, and their weight exerts on the plate 20 a relatively light engagement pressure, such that only sufficient torque may be transmitted to get the rotor started without straining it. As the rotor speed increases the cams 27 press the driven plate 20 harder against the driving plate until, when the rotor has attained sufficient speed, the clutch is capable of transmitting the maximum torque of the engine. Provision is made for manually disconnecting the clutch at any time by means of a pivoted forked lever 28 which is operated by a cable 29 from the pilot's cockpit to withdraw the clutch plate 18 against the pressure of the spring 19.

The rotor will normally be put at the no-lift pitch setting while being started up. Its rotational drag is then abnormally low, and it can therefore be raised to an abnormally high speed before the lift lever 4 is operated to effect the direct take-off. The initial acceleration away from the ground will therefore be high, but since the engine will be running at a high speed while lightly loaded it will not be delivering an unduly high torque, the excess lift being obtained rather from the excess kinetic energy of the rotor. In any case, the fuselage has a high polar moment of inertia and a general resistance to rotation during this relatively brief period, especially in view of its large tail.

The machine is mounted on an undercarriage of what is known as the tricycle type, comprising two main supporting wheels 30 situated slightly behind the center of gravity C. G. and a single forward wheel 31 which may be freely castoring or, preferably, steerable by being connected to the pilot's rudder bar.

The fuselage may readily be constructed as a watertight hull so that the helicopter is amphibian. In this case the leg structures 32 carrying the main wheels 30 may be pivoted at their roots about longitudinal axes at 33 (see Figure 3) so that the wheels 30 may be placed at the surface of the water when the aircraft is afloat and act as lateral stabilising floats; if desired, additional buoyancy members 34 may be incorporated in the structures 32 as shown. It may be noted that in this position the rebound-damping means usually associated with undercarriage legs will act to damp out rolling movements of the floating aircraft.

Further upward movement of the undercarriage members about the axes 33 in flight may be arranged to bring them into a fully retracted position nesting in the fuselage sides below the rotor hub.

A contemplated form of helicopter constructed as above described and as shown in the accompanying drawings has a rotor radius of about 19.6 feet and an all-up weight of about 2400 pounds. Investigation shows the minimum torque for hovering to be about 2400 lbs. ft. Thus the ratio of minimum hovering torque to weight is unity (one foot); that is to say 0.051 of the rotor radius.

I claim:

1. A helicopter comprising a single rotor constituting the sole lifting and propelling agency in flight, said rotor having a low rotor solidity and a thin high-speed blade profile giving in combination, over at least that portion of the rotor disk swept by the outer two thirds of a blade, a value below 0.09 for the minima of $$\left[\frac{C_{Dp}}{C_L} + \frac{1}{2}\sqrt{C_{L}.\sigma}\right]$$

at the successive annular elemental areas of said disk portion, where $C_{Dp}$ and $C_L$ are associated drag and lift coefficients of said blade profile for any of said elemental areas and $\sigma$ is the solidity over the same elemental area.

2. A helicopter comprising a single rotor constituting the sole lifting and propelling agency in flight, said rotor having a solidity, over at least that portion of the rotor disc swept by the outer two thirds of a blade, below 4% and a blade profile substantially similar to that known as N. A. C. A. 23009, whereby said rotor absorbs the power applied to it during flight at a high tip speed and a correspondingly low torque.

3. A helicopter, as claimed in claim 2, and wherein each blade is constructed with an inherent upward curvature or "set" for reducing its droop when at rest.

4. A helicopter comprising a single rotor constituting the sole lifting and propelling agency in flight, said rotor having a low rotor solidity and a thin high-speed blade profile giving in combination, over at least that portion of the rotor disk swept by the outer two thirds of a blade, a value below 0.09 for the minima of $$\left[\frac{C_{Dp}}{C_L} + \frac{1}{2}\sqrt{C_{L}.\sigma}\right]$$

at the successive annular elemental areas of said disk portion, where $C_{Dp}$ and $C_L$ are associated profile drag and lift coefficients of said blade profile for any of said elemental areas and $\sigma$ is the solidity over the same elemental area, and a fuselage suspended from said rotor and elongated in the direction of forward flight, said fuselage being shaped as an airfoil receiving from the downwash of said rotor in flight an aerodynamic torque opposing the mechanical torque reaction thereon.

5. A helicopter constructed in accordance with claim 4, and wherein said fuselage is constructed with vertical cross-sections of asymmetrical airfoil shape and of opposite effective camber in front of and behind the axis of said rotor respectively.

6. A helicopter constructed in accordance with claim 4, and including a stabilizing substantially horizontal tail plane mounted at the rear of said fuselage above the plane of rotation of said rotor.

RAOUL HAFNER.